May 8, 1956

R. B. DAVIDSON 2,744,766

BUNK FOR LOGGING VEHICLES

Filed Aug. 23, 1954

INVENTOR.
Robert B. Davidson
BY
Eugene D. Farley
Atty.

May 8, 1956  R. B. DAVIDSON  2,744,766
BUNK FOR LOGGING VEHICLES
Filed Aug. 23, 1954  4 Sheets-Sheet 2

INVENTOR.
Robert B. Davidson
BY
Atty.

May 8, 1956  R. B. DAVIDSON  2,744,766
BUNK FOR LOGGING VEHICLES
Filed Aug. 23, 1954  4 Sheets-Sheet 3

INVENTOR.
Robert B. Davidson
BY

Atty.

May 8, 1956  R. B. DAVIDSON  2,744,766
BUNK FOR LOGGING VEHICLES
Filed Aug. 23, 1954  4 Sheets-Sheet 4

INVENTOR.
Robert B. Davidson
BY
Eugene D. Farley
Atty.

United States Patent Office 2,744,766
Patented May 8, 1956

2,744,766

BUNK FOR LOGGING VEHICLES

Robert B. Davidson, Vaughn, Wash.

Application August 23, 1954, Serial No. 451,663

18 Claims. (Cl. 280—145)

This invention relates to a bunk for supporting logs or log carrying vehicles. It is designed primarily for use on logging trucks, although it may be employed on other types of vehicles, such as railroad cars.

It is conventional practice in the logging industry to employ log trucks having transversely disposed bunks for supporting the logs. Each bunk is provided at each of its ends with a stake or chock for preventing the logs from rolling off. In addition, there are provided one or more binder chains or cables. These are placed around the logs on the truck and the loose ends fastened together by means of a binder jack or similar mechanism.

When the logs are to be unloaded, it is necessary to release the binder chains from a position proximate the logs. This is an extremely hazardous undertaking, since the logs may not have been carefully loaded, or may have become displaced during their transportation so that they fall to the ground as soon as the chains are released. Many lives have been lost as a result of such occurrences. In addition, using such chains is a time consuming and troublesome operation, particularly in view of the fact they they may become jammed, which necessitates cutting them, or they may become lost during the return trip of the truck.

Another hazard encountered in the handling of logs on logging trucks resides in the transport of the logs over winding roads, particularly those improvised roads leading from the logging site. The bunks of the prior art are severely restricted in their degree of pivot, frequently resulting in what is commonly known as "bunk-bind." This occurs when the bunk cannot pivot with sufficient ease to accommodate the angular displacement of the truck and trailer necessary to negotiate sharp curves.

In the log hauling industry, it is becoming increasingly necessary that the log loads be weighed at some point during transport. To the independent haulers, weighing is necessary in order to determine the pay load for which their hauling charges are made. In every hauling operation conducted upon state highways, the weighing of log loads is required by law, since there are maximum weight limits allowed upon the highways. Weights in excess of legal limits result in substantial fines which increase in magnitude as the load limit is exceeded.

The matter of overload fines is a serious problem to the logging truck operators, for truck mounted scales of the prior art are not only costly, but their accuracy is subject to change, depending in part upon conditions of use and maintenance. For example, such scales are usually mounted upon exposed parts of a vehicle, which are subject to damage by falling objects and which may collect road tars and other materials, the accumulation of which impairs proper operation of the scales.

In view of the foregoing, it is a primary object of this invention to provide a bunk for logging vehicles which holds the logs securely while they are in transport, and which may be operated to release the logs from a remote station and with complete safety to the operator.

Another object of this invention is the provision of a bunk for logging vehicles, which, in addition to being safe, is operable with speed and facility to release the logs even under conditions of extreme pressure of logs against the confining stakes and binders.

It is another object of the present invention to provide a bunk for logging vehicles which is provided with both stakes and log retaining binder cables which may be operated positively from a remote station for their contemporaneous or sequential release.

A further object of this invention is the provision of a bunk for logging vehicles which is provided with both stakes and log retaining binder cables which may be operated from a remote station by air, hydraulic, or mechanical means.

It is another object of the present invention to provide a stake bunk for logging vehicles provided with binder cables, the cables being arranged for manual fixation after the stakes are locked in log supporting position and the vehicle has been fully loaded with logs.

Still another object of this invention is to provide a bunk for logging vehicles which is provided with stakes for retaining the load, the stakes being pivotable between a raised position wherein they retain the load, and a lowered position wherein they act as skids for discharging the load, or for loading material onto the truck.

Another object of this invention is the provision of a stake bunk for logging vehicles wherein the stake is adapted to be positioned in a plurality of log-supporting positions to accommodate various widths of loads, independently of the length of the bunk.

Another object of this invention is to provide a bunk for logging vehicles which has stakes which may be maintained rigidly in a predetermined position, thereby holding the load securely on the vehicle in a fixed position.

Another object of the present invention is to provide a stake bunk for logging vehicles, the stakes of which have smooth exterior surfaces for the logs to rub against while being loaded, thereby making possible their precise alignment with respect to the other logs comprising the load on the vehicle.

It is another object of this invention to provide a bunk for logging vehicles which is provided with stakes for retaining the load, the stakes being readily removable and replaceable with chocks or short shakes when such is desired for accommodating logs of unusual dimension.

It is another object of the present invention to provide a bunk for logging vehicles which provides maximum flat loading space for minimum vehicle width, and which will accommodate either logs or timbers of any cross sectional dimension.

Another object of this invention is to provide a bunk for logging vehicles which is sturdy in construction so that it can withstand heavy blows from logs being loaded thereon.

It is another object of the present invention to provide a bunk for logging vehicles which is provided with mechanism for retaining logs on the vehicle and for discharging them therefrom, such mechanism being protected from damage without extending outwardly from the sides of the vehicle and thereby undesirably increasing its overall width, which is limited by law.

Another object of the present invention is to provide a bunk for logging vehicles which is provided with an improved chain or cable and means integral with the bunk for receiving and storing the chain or cable when the same is not in use, and for tightening it when it is used to restrain log loads of varying size.

A further object of the present invention is to provide a bunk for logging vehicles which is particularly adaptable for use on logging vehicles of the truck-trailer type which are flexible and necessitate frequent shifting of position of the vehicle relative to the load, as the former turns while traversing a logging road.

Another object of this invention is to provide a bunk for logging vehicles wherein the bunk is supported by rollers upon a turntable, whereby to achieve maximum facility in shifting the position of the vehicle relative to the log load, thereby substantially eliminating the hazard of "bunk-bind."

A still further object of this invention is the provision of a bunk for load carrying vehicles incorporating as an integral part thereof a load weighing scale.

Another object of this invention is the provision of a bunk for logging vehicles, wherein the bunk is supported on rollers on a turntable and wherein the said rollers form an integral part of a built-in scale, whereby to permit the weighing of log loads even when the latter is shifted to a substantial angle relative to the vehicle.

A still further object of the present invention is to provide a bunk for logging vehicles having a load-weighing scale and releasable log restraining stakes and wherein a single control is operable selectively to weigh or release the load.

Still another object of the present invention is to provide a bunk for logging vehicles having a built-in load weighing scale and releasable log restraining stakes and wherein the mechanism for actuating said scale and stakes is confined within the bunk, whereby to insure safety of the mechanism against damage by falling logs or jamming by dirt or other material.

The manner in which the foregoing and other objects of this invention are accomplished will be apparent from the following specification and claims, considered together with the drawings, wherein like numerals of reference indicate like parts, and wherein:

The illustrated construction of the logging bunk of the present invention includes an elongated hollow bunk comprising the spaced side plates 10, 11, the overlying top plate 12, secured thereto as by welding, the bottom central plate 13 also rigidly secured to the bottom edges of the side plate, and the pairs of plates 14 and 15 secured to the bottom edges of the side plates and spaced laterally outward and concentrically from the center plate 13. Although the foregoing assembly is illustrated in the drawings as an integral construction, in actual manufacture the side plates and top plate are constructed of channel irons, the side plates being arranged back to back with the flanges projecting outwardly and the top channel iron being secured thereto, as by welding, with its lateral flanges extending upwardly.

The bottom center plate 13 is provided with a central aperture 16. Secured rigidly to the center plate, or formed integral therewith, and depending downwardly therefrom concentrically about the central aperture is a turntable cup 17. This cup is received rotatably within a well 18 forming the center of a turntable 19 secured rigidly in any well-known manner to the base frame (not shown) of a logging vehicle. The turntable may be formed as a complete circle or merely as arcuate sections of a circle, depending upon the degree of pivot required for a given installation. The turntable is preferably thickened in any annular or arcuate area and surface hardened to provide a long wearing annular raceway 20 which supports the rotatable bunk in the manner described in detail hereinafter.

A hollow stud 21 is secured rigidly or otherwise formed integral with the well 18 and projects upwardly from the center thereof through the aperture 16 in the central plate. The upper end of the stud is provided with a hollow removable threaded nut 22 which functions to prevent vertical displacement of the turntable cup within the well, thereby securing the bunk to the turntable. The stud is generally known as a king bolt.

The bunk is supported upon the turntable raceway 20 by means of a plurality of rollers 23 which project through an opening in each of the laterally spaced bottom plates 14. Each set of rollers is mounted rotatably upon a shaft 24 which extends transversely through the depending outward section of the roller support arm 25. The support arm extends obliquely outward through an opening 26 in the side plates of the bunk and is pivoted on shaft 27 secured between the spaced flanges 28 which project obliquely outward from the supporting side plates of the bunk, as best shown in Figure 4.

The shaft 24 supporting the rollers 23 extends on an axis which projects through the axis of the stud 21, whereby to position the rollers for rotation on a circular path disposed concentrically about the stud.

Figure 3:
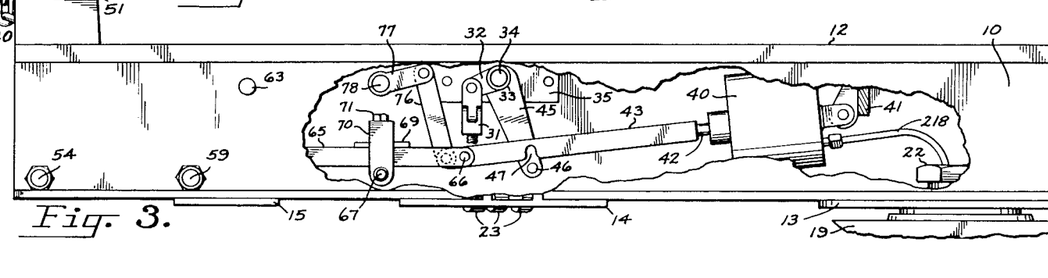
Figure 3 is a fragmentary front view similar to Figure 1, but showing the stake release and scale mechanism in the stake release position.
Figures 4, 5, 6, 7, 8:
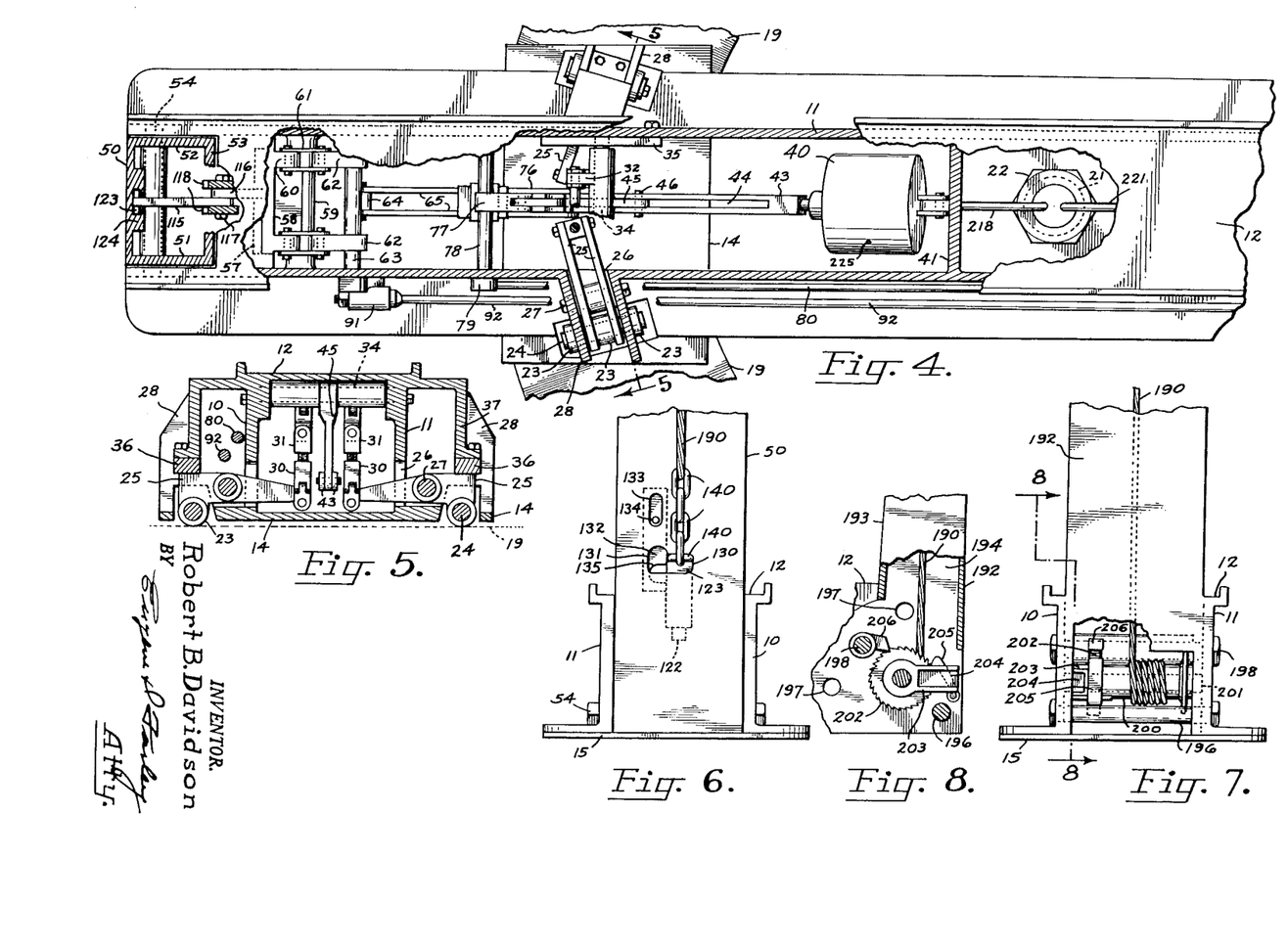
Figure 4 is a fragmentary plan view of the bunk shown in Figures 1 and 2, with parts thereof being broken away to disclose details of construction.
Figure 5 is a sectional view taken along the line 5—5 in Figure 4.
Figure 6 is a fragmentary end view of the bunk as viewed from the left in Figure 1.
Figure 7 is a fragmentary end view of the bunk as viewed from the right in Figure 2, parts thereof being broken away to disclose details of construction of the log binder storing and tightening mechanism.
Figure 8 is a fragmentary sectional view taken along the line 8—8 in Figure 7.

As best shown in Figure 5 of the drawings, each of the roller support arms 25 is connected at its inner end by means of the pair of universal connectors 30 and 31 and lever 32 (Figure 3) to sleeve 33 rotatably mounted on shaft 34 which, in turn, is mounted at its ends in the straps 35 which are secured to the inner faces of the side plates of the bunk. Thus, as will be developed more fully hereinafter, rotation of shaft 34 causes limited rotation of the roller support arms 25 about the axis of the pivot shaft 27, thereby effecting the raising and lowering of the rollers with respect to the bottom bunk plate 14. The degree of retraction of the rollers is limited by the stop 36 mounted upon the bracket 37 which extends outwardly from the side plates of the bunk, and arranged for abutment by the outer end of the roller support arm 25.

Figure 1:
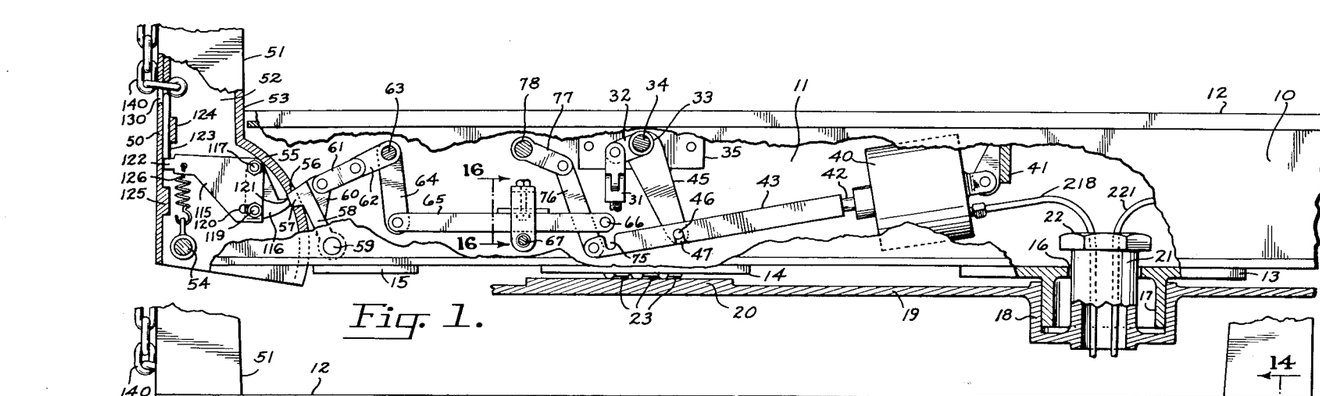
Figure 1 is a fragmentary front view of a bunk embodying the features of the present invention, the same being partly broken away to show details of internal construction of the stake release and scale mechanism, the latter being shown in load weighing position.

Elevation of the bunk through pivoting of the roller support arms 25 is accomplished by mechanical means, now to be described. Referring to Figures 1, 3 and 4 of the drawings, the mechanical means illustrated may be either pneumatic or hydraulic. The system for actuating the roller support arms on opposite sides of the pivot stud 21 is the same and therefore the following description is directed to the assembly mounted to the left of center, since said mechanism is also related to the releasable stake securing mechanism to be described hereinafter. It will be understood that this latter mechanism is omitted on the right side of center, since the right hand stake remains permanently in a fixed position.

An air or hydraulic cylinder 40 is mounted pivotally at its rearward end on a bracket 41 extending between the side plates of the bunk. A reciprocating piston is contained within the cylinder and is provided with a piston rod 42 which projects through the forward end of the cylinder for connection to one end of the thrust arm 43. This arm is provided with a longitudinal slot 44 intermediate its ends for receiving therein the free end of arm 45. This latter arm is mounted on shaft 34 and forms a bell crank lever with the lever arm 32. A transverse pin 46 in the lower end of arm 45 is arranged for removable reception in the notches 47 formed in the lower edges of the thrust arm 43. As explained in greater detail hereinafter, extended movement of thrust arm 43 by actuating of the power cylinder 40 rotates the bell crank arms 45, 32 clockwise and pivots the roller support arms in the direction to lower the rollers 23 with respect to the bunk, thereby elevating the bunk from the turntable to a distance greater than is shown in Figure 1. This action separates the support arms 25 from the stops 36 and permits the bunk and load to be supported by the pressure system described hereinafter, thereby affording convenient means by which to measure the weight of the load.

Referring now to the left hand portion of Figures 1 to 4 inclusive, the bunk of the present invention also includes a releasable log supporting stake. In the embodiment illustrated, the stake is formed as a hollow member comprising the outer face plate 50, the side plates 51, 52 and the inner face plate 53. The stake is pivotally mounted between the projecting side plates of the bunk by means of pivot bolt 54 which extends through the side plates of the bunk and stake adjacent the lower edge thereof. Thus, it will be apparent that the stake may readily be removed for replacement or repair.

The inner face plate 53 adjacent the lower end of the stake is curved arcuately, as best shown in Figure 1, about pivot bolt 54 as a center. This curved portion 55 of the inner face plate is provided with an aperture 56 adapted to removably receive the projection 57 of the locking jaw 58. The locking jaw is mounted pivotally on pin 59 which is secured in the side plates of the bunk. It is to be noted that the pin 59 is positioned in such manner, with respect to the curved portion 55 of the inner face plate of the stake, that the projection 57 of the locking jaw tends to remove itself from the opening 56. This construction is preferred, for it renders the release mechanism for the stake operable with ease even when extreme binding pressures are exerted by the logs upon the releasable stake.

As best shown in Figure 4, the locking jaw 58 comprises a plate member, the upper edges of which are provided with projecting lugs 60. These lugs are pivotally connected by links 61 to one arm 62 of a bell crank lever supported for rotation on shaft 63, which extends between the side plates of the bunk. The other arm 64 of the bell crank lever is pivotally connected at its free end to one end of thrust link 65 which, as best shown in Figure 4, comprises a pair of spaced bars which are maintained in substantially parallel relation by the pivot connection to bell crank arm 64 at one end and by the spacer rod 66 at the other end.

The thrust link 65 is supported intermediate its ends upon pin 67 which extends between the side plates of the bunk, and is maintained in such position resiliently by means of compression spring 68 (Figure 16) which is confined between a pressure plate 69 engaging the spaced bars of the thrust link and the intermediate section of the U-shaped clamp 70. The clamp is mounted upon the pin 67 and is maintained in vertical position by means of the adjustable bolt 71 which extends through the spring and through registering openings in the clamp and pressure plate.

Adjacent the projecting end of thrust arm 43 are provided a second pair of notches 75 which extend inwardly from the upper edge of the arm. These notches are disposed for reception of the spacer pin 66 provided at the free end of the thrust link 65.

Figure 2:
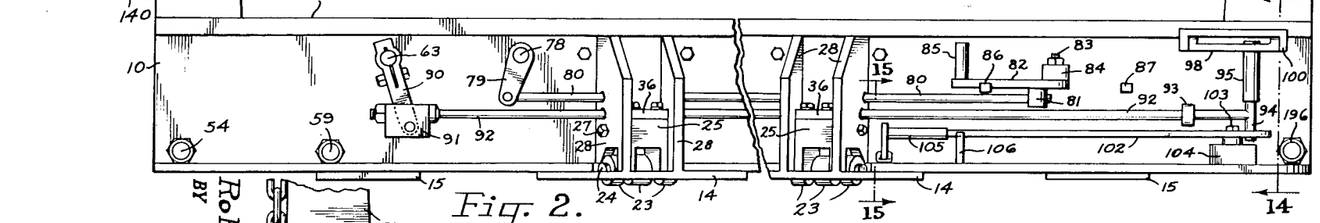
Figure 2 is a foreshortened front view of the bunk of Figure 1, and showing the auxiliary manual stake release mechanism and the selector mechanism for the stake release and scale actuating mechanism of the present invention.

The free end of thrust arm 43 is pivotally connected through link 76 to one arm 77 of a bell crank lever, which is mounted rigidly on shaft 78 secured for rotation in the spaced side plates of the bunk. The shaft extends outwardly of the front side plate, as seen in Figure 2, to receive the second arm 79 of the latter mentioned bell crank lever. This second arm is pivotally connected through actuating rod 80 which extends laterally through openings in the flanges 28 to a point adjacent the right hand side of the bunk, i. e. at a position remote from the releasable stake. This remote end of rod 80 is pivotally connected through a transverse pivot 81 to an actuating lever 82 intermediate the ends of the latter. The actuating lever is mounted pivotally by means of bolt 83 on a support 84 secured to the side plate 10 of the bunk, and the opposite end of the actuating lever is provided with a handle 85. The actuating lever is maintained in its two positions of adjustment by means of the snap catches 86, 87, which are secured to the side plate of the bunk on opposite sides of the pivot bolt 83.

The actuating lever 82 is shown in Figure 2 in the position to the left of its pivot bolt 83, in which position the actuating rod 80 has pivoted the bell crank lever shaft 78 clockwise and thus lowered the thrust arm 43 (Figure 1) for engagement of the pins 46 within the notches 47. In this position of adjustment, it will be apparent that the thrust arm is capable of actuating the bell crank arms 45, 32 when the piston rod 42 is extended toward the left. Such movement of the piston rod pivots the said bell crank arms clockwise, thereby raising the universal joints 30, 31 and pivoting the roller support arms 25 to lower the rollers and elevate the bunk.

In Figure 3 of the drawings, the actuating lever 82 (Figure 2) has been swung to its position to the right of its pivot bolt 83, thereby drawing the actuating rod 80 to the right and rotating the bell crank shaft 78 counter-clockwise and raising the extended end of the thrust arm 43. In this position of adjustment, the aforementioned notches 47 have been drawn upwardly into engagement with the spacer pin 66 on the free end of thrust link 65. In this position of adjustment, extension of the piston rod 42 causes clockwise rotation of the bell crank arms 62, 64 and simultaneously retraction of the projection 57 of the locking jaw 58, thereby effecting release of the pivoted stake.

Fixation of the stake is again accomplished by reversing the above procedure, with pressure being kept upon thrust arm 43 until the stake is raised into upright position, and then retracting arm 43 and forcing locking jaw 58 into engagement with aperture 56. Retraction of arm 43 can be accomplished by reversing the direction of pressure against the piston in cylinder 40, or by a recoil spring (not shown) within the cylinder.

Manual means is also provided for emergency use in releasing the stake, in the event that air or hydraulic power is temporarily interrupted. The pivot shaft 63 for the bell crank arms 62, 64 projects outwardly from the front face of side plate 10 for positive attachment of the arm 90. The lower end of this arm is connected through a swivel knuckle 91 to one end of actuating rod 92 which extends laterally along the outer face of side plate 10 through openings in the flanges 28 to a point adjacent the right end of the bunk. Adjacent its right hand end, the actuating rod 92 extends slidably through an opening in a bracket 93 projecting from the side plate 10.

Figures 14, 15, 16, 18:
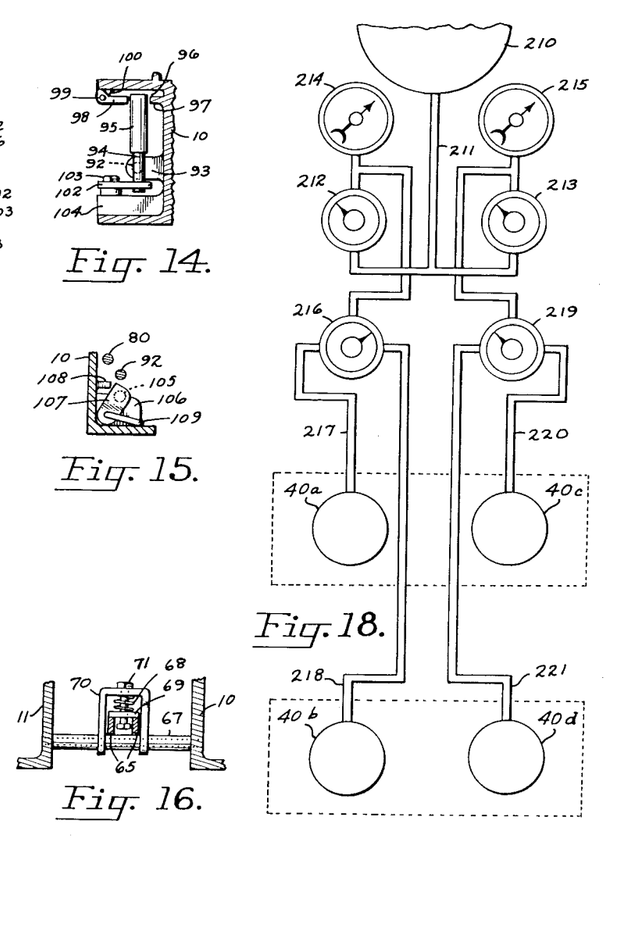
Figure 14 is a fragmentary sectional view taken along the line 14—14 in Figure 2.
Figure 15 is a fragmentary sectional view taken along the line 15—15 in Figure 2.
Figure 16 is a fragmentary sectional view taken along the line 16—16 in Figure 1.
Figure 18 is a schematic diagram of a pneumatic or hydraulic circuit for the scale system of the present invention.

The right hand end of the actuating rod is attached pivotally to a transverse bar 94, the upper end of which is provided with a handle 95. As best shown in Figure 14, the upper end of this handle is received within a slot 96 formed between a projection 97 on the side plate of the bunk and a retractable bar 98 supported pivotally by pins 99 which are secured in lugs 100 depending from the upper flange of the side plate 10. In this manner, the handle 95 may be released from its secured position by moving the bar manually in counterclockwise rotation about the pins 99, thereby permitting the handle to be swung downwardly in counterclockwise rotation about the axis of actuating rod 92.

The lower end of the transverse rod 94 is positioned for removable engagement in a groove 101 provided adjacent the right hand end of trip lever 102. This lever is mounted pivotally adjacent the groove on a vertical pivot bolt 103 secured to the bracket 104 projecting from the lever flange of side plate 10. The lever extends to the left from the pivot bolt and terminates in a handle 105. The lever is retained in a locked position by being snapped into a notch formed in the flange 106 projecting from the side plate 10 (Figure 15). Since the trip lever is of substantial dimension and therefore quite rigid, means is provided for swinging the same upwardly out of the retaining notch in flange 106, from the safety of a position remote from the load. In the embodiment illustrated, this means includes a cam member 107 secured pivotally to the end of handle 105 and having a rounded end adapted to engage upon the lower flange portion of side plate 10. A bumper block 108 projects from the side plate 10 for engagement with the upper end of the cam member and a rope 109 extends from the lower portion of the cam member for manual operation.

Thus, by pulling on the rope the cam member is caused to pivot in a counterclockwise direction (Figure 15) about the axis of handle 105, thereby springing the lever upwardly out of the notch in the flange 106. Then, as the upper end of the cam engages the bumper block, the cam and attached lever is caused to be swung outwardly out of the notch sufficient to permit the lever to be pulled outwardly away from the bunk.

With the transverse bar 94 engaged in the groove 101 in lever 102 and the handle 95 confined in the slot 96 between the projection 97 and pivotable plate 98, it will be seen that counterclockwise rotation of the lever 102 (Figure 13) will cause actuating rod 92 to be moved toward the left. Shaft 63 and the associated bell crank arms 62, 64 are thereupon rotated in a clockwise direction (Figure 1) to retract the locking jaw 58 and release the stake.

Incorporated in this combination of lever 102 with its notch 101 and actuating bar 92 and its transverse bar 94 is a safety lock to prevent accidental release of locking jaw 57, 58 from aperture 56 while a load is in transport. It can readily be seen that when handle 95 is held behind bar 98 that the lower end of bar 94 cannot come out of notch 101. Thus when lever 102 is in locked position, actuating rod 92 cannot be moved, thereby holding the bell crank 62—64 in fixation. Where it is desired to operate the trip mechanism by power, it is necessary to first raise the plate 98, thus releasing handle 95, which then is swung out from the bunk, thereby removing the short end of crossbar 94 from notch 101. This will allow actuating rod 92 to move as power is applied to bell crank 62—64 of the tripping sequence. For manual operation of the tripping mechanism, handle 95 is left secured, slidably, behind plate 98 and the trip-lever 102 is pulled outward from the bunk by rope 109 until bell crank 62—64 has been rotated sufficiently to withdraw jaw 57 from aperture 56.

Means is also provided for automatically releasing a log securing binding cable simultaneously with the release of the stake. In the embodiment illustrated in Figure 1, this means includes a pawl comprising the pair of plates 115, 116 arranged in overlapping position and pivotally secured together by means of pivot pin 117 supported in brackets 118 secured to the stake. Adjustment of the pair of plates relative to each other is afforded by means of bolt 119 which is secured to plate 116 and extends through an arcuate slot 120 formed in the other plate 115. Pawl plate 116 is provided with a projection 121 which is adapted to engage the projection 57 on the locking jaw 58. The end of plate 115 opposite the pivot connection is provided with a projection 122 adapted to underlie and support the locking bar 123 which is positioned against the inner face of the outer plate 50 of the stake and is confined slidably thereagainst by means of the side brackets 124. In the modification illustrated, these side brackets are shown to be formed integrally with the outer plate of the stake, although it will be understood that they may comprise separate pieces firmly secured to the stakes by such means as welding.

The pawl projection 122 is restricted in its downward movement, i. e. counterclockwise rotation of the pawl, by means of a stop 125 formed on the outer plate of the stake, and the pawl is also normally urged into counterclockwise rotation by means of spring 126 secured to one end to the pawl and at the opposite end to the pivot shaft 54 of the stake.

Referring now to Figure 6 of the drawings, the locking bar 123 is shown to align with an opening 130 in the outer plate of the stake. A second opening 131 is formed to the left of the first opening and communicates therewith, the second opening being longer in vertical dimension than the first opening. Registering with the second opening is a vertically slidable sealing bar 132 which is arranged in edge abutting relation with the locking bar and is confined slidably against the inner face of the outer plates by means of the side brackets 124 previously described. A third vertically elongated opening 133 registers with the sealing bar, and a stud 134 secured to the sealing bar extends through the third opening for manual manipulation by the operator.

The sealing bar is provided adjacent its lower end with a notch 135 which is arranged for cooperative registration with the second opening when the sealing bar is in its elevated position. In the position of adjustment shown in Figure 6, the notch is in a position lower than the upper edge of the locking bar, whereby to confine the chain 140 in locked position between the locking bar and the upper edge of the first opening 130.

It will be apparent that when the sealing bar is raised, by pushing upwardly on the stud 134, the notch in the sealing bar is positioned adjacent the left edge of the chain. Thus, with the locking bar 123 in retracted position the released chain may be drawn outwardly through the first opening or may be fed into position through the registering second opening and notch 135.

Figures 9, 11, 12:
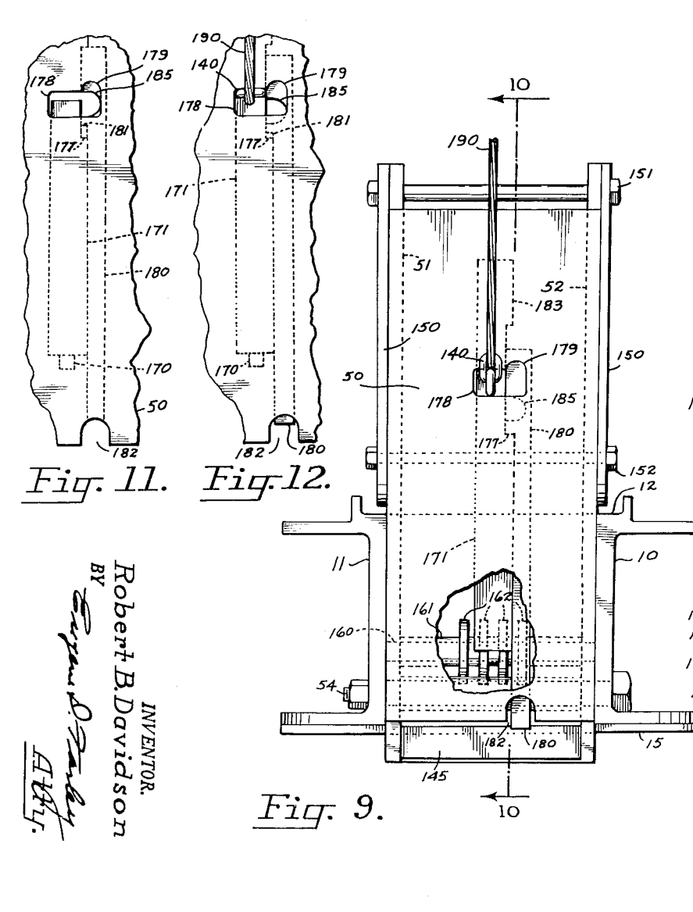
Figure 9 is an end view of a modified form of bunk embodying features of the present invention, parts thereof being broken away to disclose details of the construction providing for the positioning of the releasable stake at a plurality of angles with respect to the bunk.
Figure 11 is a fragmentary end view similar to Figure 9 and showing the chain securing mechanism in freed position.
Figure 12 is a fragmentary end view similar to Figure 11, but showing the chain securing mechanism in locked position.
Figure 10:
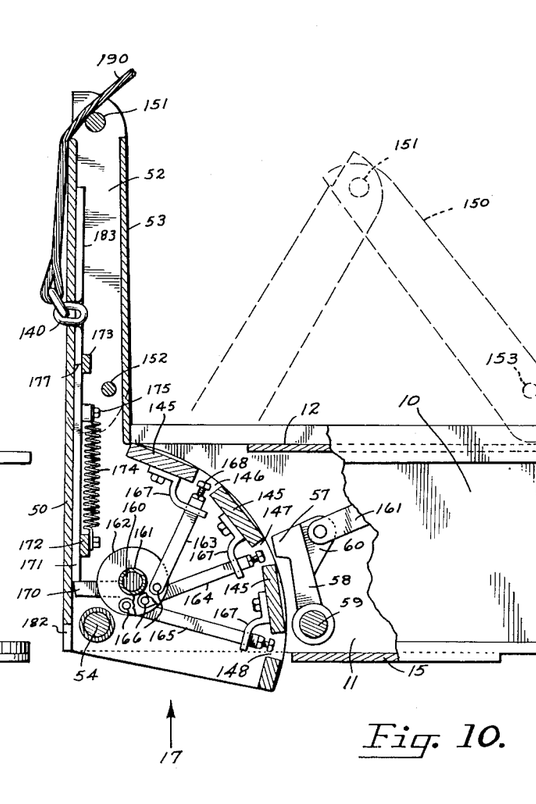
Figure 10 is a fragmentary sectional view taken along the line 10—10 in Figure 9 and showing the stake and binder mechanism in release position, a second angular position for the releasable stake being shown in dashed lines.
Figure 17:
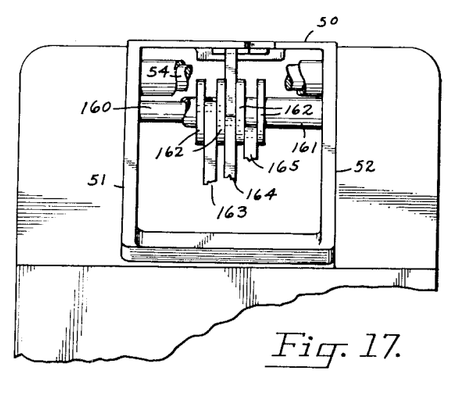
Figure 17 is a fragmentary bottom plan view as viewed in the direction of arrow 17 in Figure 10, with parts thereof broken away better to disclose details of construction.

A modified form of releasable stake is shown in Figures 9 to 11, inclusive, and Figure 17. This stake differs from the modification described hereinbefore in that it permits adjustment of the stake to a plurality of angles for supporting a load, rather than being limited to the one vertical position of adjustment provided by the first modification.

In the second modification, the arcuate lower portion 55 of the inner plate of the stake of the first modification is replaced by a plurality of transverse plates 145 secured between the opposite side plates of the stake and spaced apart to provide the transverse openings 146, 147, 148, each of which is adapted to receive the projection 57 of the locking jaw 58, as the position of adjustment of the stake is changed.

As best shown in Figure 10, the top plate 12 of the bunk is cut away adjacent its left end to permit the stake to be swung inwardly, i. e. clockwise from its vertical position, to the position of adjustment indicated in dashed lines. A pair of auxiliary stake plates 150 is mounted pivotally at its upper end on pivot bolt 151 secured adjacent the top end of the main stake. The lower end of the auxiliary stake is releasably secured to the main stake by means of bolt 152 which extends through the main stake and through the registering openings 153 formed in the auxiliary stake plates. Thus, by removal of bolt 152 the auxiliary stake may be swung outwardly to the position indicated in dashed lines in Figure 10, to reduce the effective load supporting width of the bunk when so desired.

A shaft 160 is mounted transversely between the side plates 51, 52 of the stake adjacent the lower end thereof, and a sleeve 161 is rotatably mounted on said shaft. Four discs 162 are secured to the sleeve in laterally spaced relation, as best seen in Figure 17. Three actuating bars 163, 164, 165 are each mounted adjacent one end between adjacent pairs of discs by means of pivot pins 166 secured in said discs. The actuating bars 163, 164, 165 extend outwardly for registration with the respective slots 146, 147, 148 and are maintained in proper registration by brackets 167 through which the actuating rods are slidable longitudinally. The actuating rods are each provided with a terminal adjustment head 168 for adjusting the position of the rods relative to the locking jaw 58.

An actuating bar 170 is secured between the two central discs and extends outwardly therefrom for engagement with the bottom end of the locking bar 171. The locking bar is disposed against the inner face of the outer plate 50 of the stake and is slidable vertically with respect thereto, as in the modification first described. The locking bar is held in slidable position by means of the brackets 172, 173 and is urged toward its downwardmost position by means of spring 174 secured at its upper end to the locking bar by means of the securing bolt 175, and at its lower end to the bracket 172. Accordingly, the spring functions to urge the disc assembly into counter clockwise rotation, whereby to position the actuating rods normally in full extended position.

The upper end of the locking bar 171 is reduced in width, providing a shoulder 177. The reduced end registers with an opening 178 provided in the outer plate of the stake. A second opening 179, adjacent the right side of the first opening and communicated therewith, is arranged for registration with a sealing bar 180. The upper end of the sealing bar is widened, providing a shoulder 181, similar to the shoulder provided on the locking bar. The sealing bar is positioned in edge abutting relation with the locking bar, the enlarged end of the sealing bar registering with the reduced end of the locking bar, as shown. The sealing bar is reciprocated vertically from its lower end which is exposed through a notch 182 provided in the lower end of the outer plate 50. The extent of upward movement of the sealing bar is limited by means of the notched plate 183 secured to the inner surface of the outer plate above the opening 178.

Plate 183 also serves as a fixed locking bar for retaining chain 140, opposing the slidable bar 171, both being beveled on the inner edges of their adjacent ends, to conform to the rounded ends of the links of chain 140, as shown in Figure 10.

The sealing bar is provided with a notch 185 extending inwardly from the left edge thereof and arranged for adjustable registration with the second opening 179. For example, in Figure 11 the sealing bar is shown in its fully elevated position wherein the notch registers with both the first and second openings. The locking bar is also in elevated position, leaving just sufficient room between its upper end and the upper edge of the first opening to receive a link 140 of the logging cable assembly flatwise therebetween. In Figure 12, the chain link is shown in position and the sealing bar moved downwardly a distance sufficient to seal off the upper portion of the first opening, whereby to prevent lateral displacement of the secured link. In Figure 9 of the drawings, the locking bar is shown in fully retracted position, in which the first opening 178 is unobstructed, and the second opening is sealed by the portion of sealing bar 180 extending above the notch 185. In this latter position, as also shown in Figure 10, the locking mechanism is released and the chain is free to be withdrawn through the first opening 178.

From the foregoing, it will be apparent that the construction of the second modification permits adjustment of the stakes to various log-securing positions and still affords automatic release of the stake from any of these adjusted positions by means of the actuating rods and associated disc elements described hereinbefore. In both modifications, automatic release of the log-securing cable assembly is effected simultaneously or sequentially with the stake release.

Figure 13:
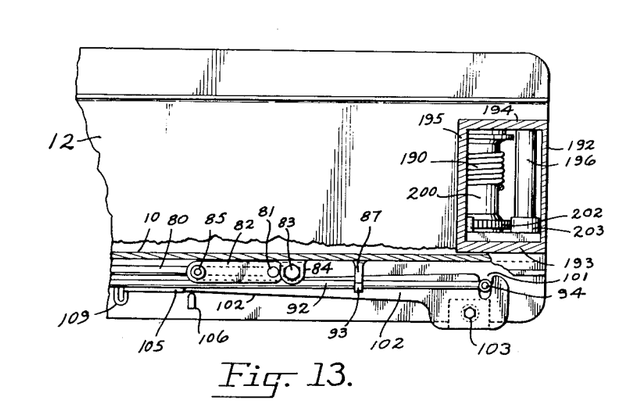
Figure 13 is a fragmentary plan view of the right hand portion of the bunk shown in Figure 2, with parts thereof being broken away to disclose details of construction.

It is preferred, although not essential, to provide a cable 190 as the log-securing means. A few links of chain 140 are secured to the free end of the cable, for use with the log binder release mechanism described hereinbefore. The cable extends upwardly along the stake, thence over a load of logs to the opposite side of the bunk. A fixed stake is provided at this side of the bunk, the stake preferably having the external shape of the releasable stake. Thus, the fixed stake comprises an upstanding hollow member, having an outer plate 192, opposed side plates 193, 194, and an inner plate plate 195 (Figure 13). The stake is secured pivotally between the lateral extensions of the side plates 10, 11 of the bunk by means of pivot pin 196.

The lower ends of the side plates of the stake project arcuately inward, as in the modification shown in Figure 10, and each side plate is provided with a plurality of openings 197 which are located on an arc drawn with pivot pin 196 as a center. The side plates of the bunk are also provided with transverse openings which are adapted to receive a bolt 198 therethrough. This bolt extends through any pair of openings 197 adjusted to register with the openings in the bunk plates, whereby the bolt functions to secure the fixed stake in any desired position of adjustment. The stake may also be provided with the auxiliary plates 150 shown in Figure 10.

Referring particularly to Figures 7, 8 and 13 of the drawings, there is provided within the lower end of the fixed stake a cable storing drum 200 which is mounted for rotation on shaft 201, secured between the side plates of the stake. Also secured to the drum is a ratchet wheel 202. Mounted upon the shaft adjacent the ratchet wheel, for rotation independently of the latter, is a ratchet-actuating arm 203 which extends outwardly toward an opening in the outer plate 192 of the fixed stake. The actuating arm is provided with an internal socket 204, adapted to receive a handle by which to operate the ratchet. Mounted pivotally upon the actuating bar is a ratchet pawl 205 arranged for engagement with the teeth on the ratchet wheel. The pawl is arranged to engage the ratchet teeth as the actuating bar is rotated in a clockwise direction (Figure 8) and to slide over the teeth when the actuating bar is rotated in a counter clockwise direction. A dog 206 is mounted pivotally on bolt 198 and is adapted to engage the teeth of the ratchet wheel to prevent counter clockwise rotation of the latter during the ratcheting operation. It is understood, of course, that this dog may be released from engagement with the ratchet wheel when it is desired to unwind the cable 190.

The cable drum functions to store the cable neatly within the fixed stake when not in use. In securing a log load, the cable is fed off the drum, upwardly through the hollow fixed stake, and across the load. The end links of chain 140 are then secured in the releasable stake, as previously described, after which the ratchet mechanism is operated to draw the cable tightly about the log load.

As indicated hereinbefore, the logging bunk of the present invention also includes a load weighing scale system which is associated with the bunk elevating mechanism described hereinbefore. In Figure 18 of the drawings, there is shown a source 210 of pneumatic or hydraulic pressure which is conveyed through line 21 and valves 212, 213 to pressure indicating gauges 214, 215, respectively. Three-way valve 216 selectively interconnects pressure gauge 214 with either of the cylinders 40a, 40b located on the left sides of the front and rear load supporting bunks, respectively, of a vehicle. These connections are made through conduits 217, and 218, respectively. Similarly, three-way valve 219 interconnects pressure gauge 215 selectively to either of the cylinders 40c, 40d positioned on the right sides of the respective front and rear bunks through conduits 220 and 221.

The operation of the scale system is as follows: With the manual selector lever 82 arranged in the position shown in Figure 2, the thrust shaft 43 is interconnected with the bell crank arm 45 associated with the roller support arms 25. Further, with the three-way valves 216, 219 arranged in the positions shown in Figure 18, the pneumatic or hydraulic system is open to the cylinders 40b and 40d mounted on the rear bunk. Thus, the operator manipulates valves 212, 213 to open the lines leading from the pneumatic or hydraulic source 210 to said cylinders on the rear bunk. The pistons contained within said cylinders are thereby operated to extend the associated piston rods and elevate the rear bunk upon the turntable 19.

Referring to Figure 4 of the drawings, the piston contained within the cylinder 40 is thus moved to the left until it passes a bleeder opening 225 in the cylinder wall. The pneumatic or hydraulic pressure thus escapes through the bleeder opening, thereby stopping further movement of the piston and giving audible signal to the operator that complete elevation of the bunk has been effected. The operator then closes valves 212, 213, shutting off the source of pneumatic or hydraulic pressure from the cylinders. The pistons in the cylinders thereupon retract under the weight of the load until the bleeder ports are sealed, thereby closing the pneumatic or hydraulic system. The resulting pressure due to the loaded rear bunk is then read in terms of pounds of load weight upon the pressure gauges 214 and 215. The foregoing procedure is repeated for the forward bunk, and the total load is obtained by summing up the readings.

From the foregoing, it is believed to be evident that the present invention provides a load supporting bunk possessing many advantages and functional operations not available heretofore. A releasable stake is provided in such manner as to automatically release a binder cable simultaneously therewith, and from many positions of adjustment of the stake, thereby permitting adjustment in the effective width of the load supporting bunk without sacrificing the desirable dual release operation. Moreover, these releasing operations may be performed from the safety of a remote position, either by mechanical or by manual means.

The bunk also provides for more flexible operation by means of the roller support, thereby substantially eliminating the hazard of "bunk bind." Furthermore, the roller and turntable assembly affords a novel and efficient basis for the incorporation of a load-weighing scale system.

The assembly of elements providing for mechanical operation of the stake release and weighing scale is confined within the structure of the bunk, whereby to insure against damage by falling logs and to reduce to a minimum the cost of replacement and repair of parts by protecting them from the accumulation of abrasives and otherwise damaging materials which may be picked up during normal operation of the vehicle.

It will be apparent to those skilled in the art that various modifications and changes in the details of construction described hereinbefore may be made without departing from the scope and spirit of the present invention. Accordingly, it is to be understood that the foregoing description is primarily illustrative of the invention and is not to be construed as limiting the scope thereof.

Having now described my invention and the manner in which the same may be used, what I claim as new and desire to secure by Letters Patent is:

1. In a bunk assembly for a load carrying vehicle, an elongated bunk, a hollow stake mounted pivotally at one end of the bunk, the lower inner side of the stake having an opening therein, locking jaw means mounted movably on the bunk for removable engagement with the said opening when the stake is in load-supporting position, load binder means secured at one end adjacent the side of the bunk opposite the pivoted stake, the outer side plate of the stake having a second opening therein for removably receiving load binder means therein, locking bar means mounted movably on the stake for removable registration with the said second opening, locking bar actuator means mounted pivotally on the stake and engaging the locking bar for moving the latter, and contact means on the locking bar actuator means arranged for engagement through the first opening with the locking jaw means, whereby the latter holds the locking bar means in lock position while simultaneously holding the stake in secured position and whereby the locking jaw means releases the locking bar means simultaneously with its release of the stake.

2. The device of claim 1 wherein the locking bar actuator means includes a pivoted pawl engaging the locking bar means at one end and the locking jaw means at the opposite end.

3. In a bunk assembly for a load carrying vehicle, an elongated bunk, a hollow stake mounted pivotally at one end of the bunk, the lower inner side of the stake having a plurality of first openings spaced circumferentially on a radius of the stake pivot, locking jaw means mounted movably on the bunk for removable engagement selectively with one of the said first openings when the stake is in selected load-supporting position, load binder means secured at one end adjacent the side of the bunk opposite the pivoted stake, one side of the stake having a second opening therein, locking bar means mounted movably on the stake for removable registration with the said second opening, locking bar actuator means mounted pivotally on the stake and engaging the locking bar means for moving the latter, and contact means on the locking bar actuator means arranged for engagement through each of the first openings with the locking jaw means, whereby the latter holds the locking bar means in lock position while simultaneously holding the stake in secured position and whereby the locking jaw means releases the locking bar means simultaneously with its release of the stake.

4. The device of claim 3 wherein the locking bar actuator means includes a plurality of spaced discs connected together for simultaneous rotation, a plurality of actuator rods pivotally connected eccentrically to the discs and each extending into registry with one of the plurality of first openings, and projecting means extending from at least one of the discs for engagement with the locking bar.

5. A bunk assembly for a load carrying vehicle, comprising an elongated bunk, a hollow stake mounted pivotally at one end of the bunk and having inner and outer side plates, the lower inner side of the stake having an opening therein, locking jaw means mounted movably on the bunk for removable engagement with the said opening when the stake is in load-supporting position, actuator means engaging the locking jaw means for disengaging the latter from the said opening, whereby to release the stake, pressure operated power means adapted to be releasably connected to the actuator means for operating the latter, control means connected to the actuator means and extending to an operating position remote from the pivoted stake, the outer side plate of the stake having a second opening therein for removably receiving load binder means therein, locking bar means mounted movably on the stake for removable registration with the said opening, locking bar actuator means mounted pivotally on the stake and engaging the locking bar for moving the latter, and contact means on the locking bar actuator means arranged for engagement through the first opening with the locking jaw means, whereby the latter holds the locking bar means in lock position while simultaneously holding the stake in secured position and whereby the locking jaw means releases the locking bar means simultaneously with its release of the stake.

6. The device of claim 5 wherein the bunk is of hollow construction and the actuator means and power means are confined within the hollow bunk.

7. A bunk assembly for a load carrying vehicle, comprising an elongated bunk, a hollow stake mounted pivotally at one end of the bunk and having inner and outer side plates, the lower inner side of the stake having an opening therein, locking jaw means mounted movably on the bunk for removable engagement with said opening when the stake is in load-supporting position, actuator means engaging the locking jaw means for disengaging the latter from the said opening, whereby to release the stake, power means connected to the actuator means for operating the latter, the outer side plate of the stake having a second opening therein for removably receiving load binder means therein, locking bar means mounted movably on the stake for removable registration with the said second opening, locking bar actuator means mounted pivotally on the stake and engaging the locking bar for moving the latter, and contact means on the locking bar actuator means arranged for engagement through the first opening with the locking jaw means, whereby the latter holds the locking bar means in lock position while simultaneously holding the stake in secured position and whereby the locking jaw means releases the locking bar means simultaneously with its release of the stake.

8. A bunk assembly for a load carrying vehicle, comprising an elongated bunk, a hollow stake mounted pivotally at one end of the bunk and having inner and outer side plates, the lower inner side of the stake having a plurality of openings spaced circumferentially on a radius of the stake pivot, locking jaw means mounted pivotally on the bunk for removable engagement with one of the said openings when the stake is in selected load-supporting position, actuator means engaging the locking jaw means for disengaging the latter from the said opening, whereby to release the stake, pressure operated power means connected to the actuator means for operating the latter, control means connected to the actuator means and extending to an operating position remote from the pivoted stake, the outer side plate of the stake having a second opening therein for removably receiving load binder means therein, locking bar means mounted movably on the stake for removable registration with the said second opening, locking bar actuator means mounted pivotally on the stake and engaging the locking bar for moving the latter, and contact means on the locking bar actuator means arranged for engagement through each of the first openings with the locking jaw means, whereby the latter holds the locking bar means in lock position while simultaneously holding the stake in secured position and whereby the locking jaw means releases the locking bar means simultaneously with its release of the stake.

9. A bunk assembly for a load carrying vehicle, comprising turntable means secured to a vehicle, an elongated bunk disposed above the turntable means, pivot means interengaging the bunk and turntable means, a stake mounted pivotally on one end of the bunk, releasable locking means on the bunk for releasably securing the stake in load-supporting position, vertically movable support means on the bunk and engaging the turntable means for supporting the bunk above the turntable, pressure operated power means adapted to releasably engage the support means for operating the latter, pressure indicator means associated with the power means for indicating the load after elevation of the bunk, the power means also being adapted to releasably engage the stake locking means for operating the latter, and selector means on the bunk for selectively engaging the power means with either of the locking means and support means.

10. The device of claim 9 wherein the bunk is of hollow construction and the actuator means and power means are confined within the hollow bunk.

11. A bunk assembly for a load carrying vehicle, comprising turntable means secured to a vehicle, an elongated bunk disposed above the turntable means, pivot means interengaging the bunk and turntable means, roller means adapted to engage the turntable, roller support means mounted on the bunk for moving the rollers between retracted and extended positions, actuator means engaging the roller support means for moving the latter, whereby to displace the bunk vertically with respect to the turntable, a stake mounted pivotally at one end of the bunk, the lower inner side of the stake having an opening therein, locking jaw means mounted movably on the bunk for removable engagement with the said opening when the stake is in load-supporting position, second actuator means engaging the locking jaw means for disengaging the latter from the said opening, whereby to release the stake, pressure operated power means adapted to be releasably connected selectively to each of the actuator means for operating the latter, pressure indicator means associated with the power means for indicating the load after operation of the first actuator means, and selector means associated with the power means and both actuator means for selectively engaging the power means with either of the actuator means.

12. A bunk assembly for a load carrying vehicle, comprising turntable means secured to a vehicle, an elongated bunk disposed above the turntable means, pivot means interengaging the bunk and turntable means, a stake mounted pivotally on one end of the bunk, releasable locking means on the bunk for releasably securing the stake in load-supporting position, load binder means secured at one end to the bunk at the end opposite the pivoted stake and adapted to overlie the load and extend to the pivoted stake, releasable load binder securing means on the pivoted stake engaging the locking means for releasing operation by the latter, vertically movable support means on the bunk and engaging the turntable means for supporting the bunk above the turntable, pressure operated power means adapted to releasably engage the support means for operating the latter, pressure indicator means associated with the power means for indicating the load after elevation of the bunk, the power means also being adapted to releasably engage the stake locking means for operating the latter, and selector means on the bunk for selectively engaging the power means with either of the locking means and support means.

13. A bunk assembly for a load carrying vehicle, comprising turntable means secured to a vehicle, an elongated bunk disposed above the turntable means, pivot means interengaging the bunk and turntable means, roller means adapted to engage the turntable, roller support means mounted on the bunk for moving the rollers between retracted and extended positions, actuator means engaging the roller support means for moving the latter, whereby to displace the bunk vertically with respect to the turntable, a stake mounted pivotally at one end of the bunk, the lower inner side of the stake having an opening therein, locking jaw means mounted movably on the bunk for removable engagement with the said opening when the stake is in load-supporting position, second actuator means engaging the locking jaw means for disengaging the latter from the said opening, whereby to release the stake, pressure operated power means adapted to be releasably connected selectively to each of the actuator means for operating the latter, pressure indicator means associated with the power means for indicating the load after operation of the first actuator means, selector means associated with the power means and both actuator means for selectively engaging the power means with either of the actuator means, load binder means secured at one end adjacent the side of the bunk opposite the pivoted stake, the outer side plate of the stake having a second opening therein for removably receiving the load binder means therein, locking bar means mounted movably on the stake for removable registration with the said second opening, locking bar actuator means mounted pivotally on the stake and engaging the locking bar for moving the latter, and contact means on the locking bar actuator means arranged for engagement through the first opening with the locking jaw means, whereby the latter holds the locking bar means in lock position while simultaneously holding the stake in secured position and whereby the locking jaw means releases the locking bar means simultaneously with its release of the stake.

14. A bunk assembly for a load carrying vehicle, comprising turntable means secured to a vehicle, a hollow elongated bunk disposed above the turntable means, pivot means interengaging the bunk and turntable means, roller means adapted to engage the turntable, roller support means mounted pivotally on the bunk for moving the rollers between retracted and extended positions, lever actuator means mounted on the bunk and engaging the roller support means for moving the latter, whereby to displace the bunk vertically with respect to the turntable, a hollow stake mounted pivotally at one end of the bunk and having inner and outer side plates, the lower inner side of the stake having a plurality of openings spaced circumferentially on a radius of the stake pivot, locking jaw means mounted pivotally on the bunk for removable engagement with one of the said openings when the stake is in selected load-supporting position, second lever actuator means mounted on the bunk and engaging the locking jaw means for disengaging the latter from the said opening, whereby to release the stake, pressure operated power means adapted to be releasably connected selectively to each of the actuator means for operating the latter, pressure indicator means associated with the power means for indicating the load after operation of the first actuator means, selector means associated with the power means and both actuator means for selectively engaging the power means with either of the actuator means, control means connected to the selector means and extending to an operating position remote from the pivoted stake, second control means connected to the second actuator means and extending to an operating position remote from the pivoted stake, being confined within the hollow bunk, load binder means secured at one end adjacent the side of the bunk opposite the pivoted stake, the outer side plate of the stake having a second opening therein for removably receiving the load binder means therein, locking bar means mounted movably on the stake for removable registration with the said second opening, locking bar actuator means mounted pivotally on the stake and engaging the locking bar for moving the latter, and contact means on the locking bar actuator means arranged for engagement through each of the first openings with the locking jaw means, whereby the latter holds the locking bar means in lock position while simultaneously holding the stake in secured position and whereby the locking jaw means releases the locking bar means simultaneously with its release of the stake.

15. In a bunk assembly for a load carrying vehicle, turntable means secured to a vehicle, an elongated bunk disposed above the turntable means, pivot means, interengaging the bunk and turntable means, roller means adapted to engage the turntable, roller support means mounted on the bunk for moving the rollers between retracted and extended positions, actuator means engaging the roller support means for moving the latter, whereby to displace the bunk vertically with respect to the turntable, pressure operated power means connected to the actuator means for operating the latter, and pressure indicator means associated with the power means for indicating the load after operation of the first actuator means.

16. The device of claim 15 wherein the bunk is of hollow construction and the actuator means and power means are confined within the hollow bunk.

17. In a bunk assembly for a load carrying vehicle, turntable means secured to a vehicle, an elongated bunk disposed above the turntable means, pivot means interengaging the bunk and turntable means, roller means adapted to engage the turntable, roller support means mounted pivotally on the bunk for moving the rollers between retracted and extended positions, lever actuator means mounted on the bunk and engaging the roller support means for moving the latter, whereby to displace the bunk vertically with respect to the turntable, pressure operated power means connected to the actuator means for operating the latter, and pressure indicator means associated with the power means for indicating the load after operation of the first actuator means.

18. In a bunk assembly for a load carrying vehicle and including a pivoted stake member at one end of the bunk and releasable locking means associated therewith for releasably securing the stake member, the combination with said locking means of power means adapted to be connected to the locking means for actuating the latter, rod means connected at one end to the locking means and terminating at the other end adjacent the opposite end of the bunk, a transverse handle pivoted to the terminal end of the rod means, an actuating lever mounted pivotally on the bunk and having a handle receiving portion for releasably receiving one end of the transverse handle therein, releasable catch means mounted pivotally on the bunk and arranged to releasably secure the transverse handle in the said handle receiving portion of the actuating lever to prevent actuation of the locking means by the power means, the power means being operable when the transverse handle is disengaged from the handle receiving portion of the actuating lever.

References Cited in the file of this patent

UNITED STATES PATENTS

| | | |
|---|---|---|
| 372,391 | Sutherland | Nov. 1, 1887 |
| 705,200 | Bradley | July 22, 1902 |
| 1,838,736 | Bonham | Dec. 29, 1931 |
| 2,256,623 | Newman | Sept. 23, 1941 |
| 2,469,760 | Berry | May 10, 1949 |